T. Ashcroft,
Operating Cut-Offs.

Nº 11,055. Patented June 13, 1854.

UNITED STATES PATENT OFFICE.

THOMAS ASHCROFT, OF DORCHESTER, MASSACHUSETTS.

OPERATING CUT-OFF VALVES FOR STEAM-ENGINES.

Specification of Letters Patent No. 11,055, dated June 13, 1854.

*To all whom it may concern:*

Be it known that I, THOMAS ASHCROFT, of Dorchester, in the county of Norfolk and State of Massachusetts, have invented a new and useful Improvement in the Means of Controlling the Operation of the Cut-Off of Steam-Engines; and I do hereby declare that the following is a full, clear, and exact description of the same, reference being had to the accompanying drawings, forming part of this specification, in which—

Figure 1:
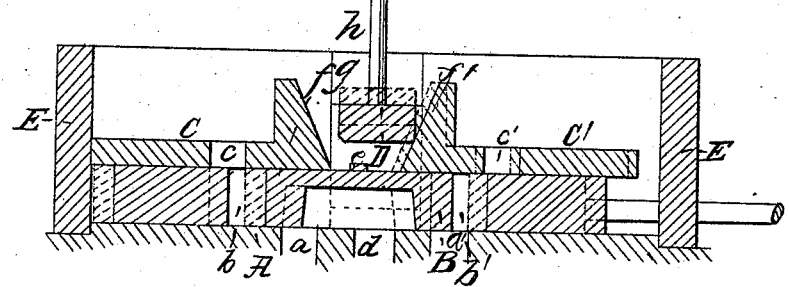
Figure 2:
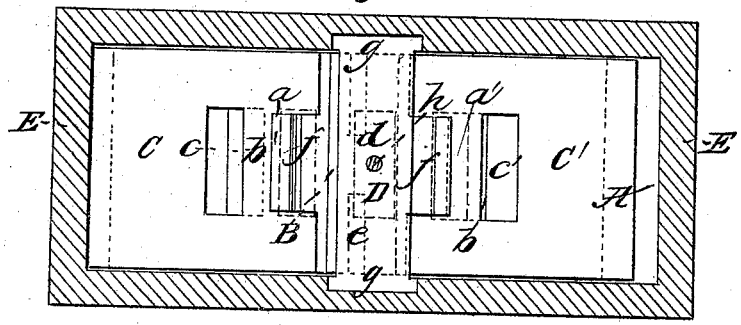
Figure 3:
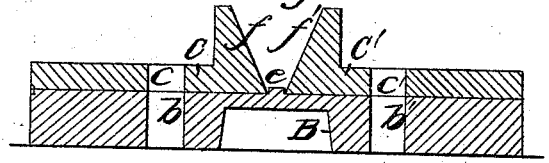

Figure 1, is a longitudinal section of the valve box, slide valve, and cut off of a steam engine, with my invention applied. Fig. 2, is a plan of the interior of the valve box. Fig. 3, is a longitudinal section of the valve and cut off without any of the other parts.

Similar letters of reference indicate corresponding parts in the several figures.

The cut off to which my invention is applicable, is one that is well known, consisting of two plates or valves, working on the back of the slide valve.

My invention consists in furnishing the cut off plates with two inclined planes, one for each plate, facing each other; and in placing between these two inclined planes, an adjustable stop bar, with which the inclined planes come in contact to arrest the cut off plates in their movements with the slide valve, and thus cut off the steam at some point in the first half of each stroke of the engine. The stop bar will arrest the motion of the cut off plates, and cut off the steam sooner or later, according as it is nearer to, or farther from, the valve, and hence by properly adjusting it, the steam may be cut off at any desired point under half stroke; or by attaching it to a governor, it may be made to act upon the plates so as to govern the engine by the cut off.

To enable those skilled in the art to make and use my invention, I will proceed to describe its construction and operation.

A, is the valve seat; $a$, $a'$, the steam ports; and $d$, the exhaust port.

B, is the slide valve, having the extension, and the ports, $b$, $b'$, which are commonly provided when the cut off works on the back.

C, C', are the cut off plates or valves, which have each a port, $c$, or $c'$, corresponding in form with one of the ports, $b$, or $b'$, in the slide valve. This port is at such a distance from the inner end of the plates that when the said inner end is in contact with two small fixed stops, $e$, $e$, on the back of the slide valve, the said port is in direct communication with the port in the slide valve, as shown in Fig. 3. The two stops, $e$, $e$, are shown in dotted outline in Fig. 2, but only one is seen in Figs. 1 and 3, as they are both in line. From the inner end of the cut off plates, C, C', rise the inclined planes, $f$, $f'$, both of similar form, but inclining in opposite directions, that is to say, each inclining backward from the inner edge of the face of the plate.

The adjustable stop bar, D, extends across the steam chest, and has its ends properly formed to slide freely in grooves, $g$, $g$, which are made perpendicularly to the face of the valve in the sides of the steam chest, E. It has a rod, $h$, attached, which is intended to work through a stuffing box in the cover or back of the steam chest, and serve to adjust it.

The slide valve receives the usual motion, and as it moves toward either end of the valve box, the cut-off plate next to that end is brought into contact with the end of the box, or with suitable stops arranged therein, and arrested in such a position that when the valve finishes its movement, the ports, $c$, and $b$, or $c'$, and $b'$, as the case may be, are in full communication, in which condition they remain during the earlier portion of the movement of the valve in the opposite direction, but when the inclined plane comes in contact with the stop bar, the cut off plate being arrested, causes the continued movement of the valve to close the port, $c$ or $c'$, in which latter condition it remains during the remainder of the movement of the valve, and until the termination of the next movement.

The operation is illustrated in Fig. 1, where the slide valve is represented in black color to be traveling in the direction of the arrow, shown under the figure, and the engine to be taking steam through the port, $a'$,—that port being about half open, and the piston of the engine having made about one quarter of a stroke. The port, $b'$, in the slide valve is nearly closed by the cut off, C', which has been arrested by the stop bar, and the port, $b$, is coming into communication with the port, $c$, in the cut off, C, which has been arrested by coming in contact with the end of the valve box. When the valve has reached the end of its stroke as represented in blue color, the ports, $b$, $c$, will be in full communication, the port, $b'$, having been some time closed. When the return movement of the valve commences, the cut offs both move with it, and when the port, $b$, arrives at $a$, at the proper time to admit steam to the cylinder, the former port being left uncovered by the cut off, C, allows the steam to enter; but as the movement of the valve continues, the cut off, C, being arrested by the stop bar, closes the port, $b$, and cuts off the steam. As the movement of the valve terminates, the port, $b'$, is uncovered by reason of the cut off, $C'$, being arrested by coming in contact with the end of the valve chest. During every movement of the valve, the proper cut off is arrested by the stop bar and made to shut off the steam, and the other cut off has its port brought into communication with the port in the slide valve.

The time of cutting off will be governed entirely by the position of the stop bar, whose operation will be understood by reference to the red outlines in Fig. 1. These outlines represent it as raised above the position in which it is represented in black, and it is shown that when in that position, the cut off plate is allowed to travel farther with the valve, and therefore does not cut off so early. This will explain how the steam will be cut off earlier in the stroke as the stop bar is lowered, or later as it is raised, and it will be readily understood, that if the rod, $h$, is properly connected with a governor, the engine may be effectually governed by the action of the stop bar and the inclined planes.

By raising or drawing back the stop bar, above, or clear of, the inclined planes, the cut off may be rendered inoperative—both the plates, C, and $C'$, assuming and remaining in the position shown in Fig. 3, and leaving the ports, $b$, $b'$, always open.

What I claim as my invention, and desire to secure by Letters Patent, is:—

Controlling the operation of the cut off plates or valves, C, $C'$, by means of two inclined planes, $f$, $f'$, one attached to each valve, and the movable stop bar, D, the whole being constructed and arranged and operating substantially as herein described.

THOMAS ASHCROFT.

Witnesses:
WILLIAM T. PARKER,
WILLIAM ROGERS,
SAMUEL C. BURR.